(12) United States Patent
Fages

(10) Patent No.: US 6,468,594 B1
(45) Date of Patent: Oct. 22, 2002

(54) METHOD FOR THERMAL PROTECTION OF A SURFACE AGAINST A THERMALLY AND MECHANICALLY AGGRESSIVE ENVIRONMENT

(75) Inventor: Jacques Fages, Bagnolet (FR)

(73) Assignee: Aerospatiale Societe Nationale Industrielle (FR)

( * ) Notice: Subject to any disclaimer, the term of this patent is extended or adjusted under 35 U.S.C. 154(b) by 0 days.

(21) Appl. No.: 09/724,084

(22) Filed: Nov. 28, 2000

Related U.S. Application Data

(62) Division of application No. 08/996,633, filed on Dec. 23, 1997, now Pat. No. 6,200,660.

(30) Foreign Application Priority Data

Dec. 26, 1996 (FR) .............................................. 96 16047

(51) Int. Cl.⁷ .............................. B05D 1/08; B65H 81/06
(52) U.S. Cl. ....................... 427/453; 427/446; 427/455; 156/169; 156/171; 156/172; 156/191; 156/192; 242/443
(58) Field of Search ................................. 156/171, 169, 156/172, 191, 192; 242/443; 442/43; 427/446, 453, 455

(56) References Cited

U.S. PATENT DOCUMENTS

| | | | | | |
|---|---|---|---|---|---|
| 4,652,476 A | * | 3/1987 | Kromrey | ...................... | 428/36 |
| 4,655,866 A | * | 4/1987 | Ferrier | ........................ | 156/192 |
| 5,145,732 A | * | 9/1992 | Kyutoku et al. | ........... | 428/36.1 |
| 5,178,922 A | * | 1/1993 | Ferrier et al. | ............... | 428/36.1 |
| 5,236,529 A | * | 8/1993 | Ferrier et al. | ................ | 156/171 |
| 5,569,427 A | * | 10/1996 | Semenova et al. | .......... | 264/129 |
| 6,200,660 B1 | * | 3/2001 | Fages | ........................ | 428/36.1 |

* cited by examiner

*Primary Examiner*—Deborah Jones
*Assistant Examiner*—Stephen Stein
(74) *Attorney, Agent, or Firm*—VanOphem & VanOphem, P.C.

(57) ABSTRACT

A thermal protection device adapted to extend along a surface to be protected from a thermally and mechanically severe external environment, having an inside face adapted to face the surface to be protected and an outside face adapted to be exposed to the external environment, includes a composite layer containing a refractory armature buried in a thermally insulative material matrix, the device further including a ceramic, metal or metalloid external layer of which the outside face is part and which is attached to the composite layer.

14 Claims, 2 Drawing Sheets

METHOD FOR THERMAL PROTECTION OF A SURFACE AGAINST A THERMALLY AND MECHANICALLY AGGRESSIVE ENVIRONMENT

CROSS REFERENCE TO RELATED APPLICATION

This application is a divisional application of application Ser. No. 08/996,633 filed Dec. 23, 1997, now U.S. Pat. No. 6,200,660.

BACKGROUND OF THE INVENTION

1. Field of the Invention

The present invention concerns the thermal protection of structural surfaces in the presence of an erosive flow. The invention is more particularly concerned with a thermal protection device and a method of fabricating the latter, that is intended to protect structural surfaces exposed to an erosive, and possibly corrosive, flow of gas at high speed and high temperature and to high levels of vibration, in particular when this is inherent to their operation. It is to be understood that the high-speed flow is a relative flow in the sense that it can be the movement of a vehicle in a gaseous atmosphere or a high-speed gaseous flow relative to a fixed structure, for example in a propulsion nozzle.

2. Description of the Related Art

A routine way to protect a surface from such flow is to use ablative (or ablatable) thermal protection, i.e. a coating that protects the surface and is consumed. This type of protection naturally applies only to short term exposure (in practice a few hundred seconds maximum).

The thermal protection layers of structures to be protected from an erosive flow are usually made up of composite materials with organic, organo-metallic or mineral binders capable of including powder, fiber, organic or mineral woven reinforcements. Due to the action of the hot gases, the ablatable material is subjected to the phenomenon of pyrolysis. This pyrolysis is accompanied by degradation of the carbon-containing or organo-silicic chain of the binder that renders the slag fragile and liable to break. To overcome this the thermal protection layer is routinely reinforced using various techniques.

The abrasion of an ablatable material of this type exposed to erosion by hot gases and to vibration is known to be reduced if the material is reinforced. The reinforcement embedded in the insulative material can be a metal or non-metal, woven or fibrous. There is less ablation if the fibrous or woven reinforcement is anchored and oriented in the matrix perpendicularly to the direction of the gases and there is less heat transfer if the reinforcement is oriented in the direction of the gases. The fibrous or woven reinforcements appear to offer less thermal insulation than the insulative matrix.

There are two main types of methods of making thermal protection materials:

1) a first type of method uses compression at very high pressure (typically several hundred bars) of a mass of reinforcing fibers pre-impregnated with resin; this is a kind of molding with injection of the pre-impregnated fiber mass between two half-shells; and 2) a second type of method involves winding on a fiber impregnated with a resin, impregnation preferably being effected during the winding operation.

The winding method has the advantage of not requiring such high pressures as are required by the compression method; the winding method can include a pressurized step, but the pressure in question is typically in the order of approximately ten bars at most.

Examples of thermal protection devices are given by the documents EP-0.174.886, EP-0.398.787, FR-2.652.036, EP-0.471.605 and EP-0.501.861, covering prior inventions made by the Applicant.

Document EP-0.174.886 discusses thermal protection including an insulative polymerized resin layer fixed to the surface of the wall to be protected; this layer includes an armature having a fringed mesh with a mesh part exposed to the erosive flow and fringes directed, with a predetermined inclination, towards the surface to be protected. Generally speaking, this disclosure concerns the protection of hollow structures with a monotonously changing section.

Related art document EP-0.398.787 proposes an improved solution to the above disclosure in the sense that it teaches thermal protection including, as in the previous solution, a refractory armature formed of a fringed mattress with a mesh part exposed to the erosive flow and fringes adapted to be directed towards the structure wall to be protected. The armature is embedded in a thermally insulative matrix. This thermal protection further includes a wide-mesh woven refractory material disposed parallel to the mesh part of the armature with the fringes passing through the wide mesh. The document describes a protection layer, advantageously a refractory protection layer, facing the ends of the fringes and which in practice includes a wound filament or tape binding the woven refractory material. This layer is advantageously eliminated after curing, during final machining of the thermal protection, so that in practice none of it remains during use of the thermal protection.

Related art document FR-2.652.036 proposes a thermal protection coating having a different structure in that it includes a main layer formed of a succession of refractory fibrous reinforcement slices substantially parallel to each other but inclined to the surface to be protected and between which insulative slices are interleaved, this main layer being lined with at least one sub-layer extending along the surface to be protected and essentially consisting of an insulative material compatible with that of the insulative slices. The refractory fibrous reinforcement is in practice a tape. The sub-layer is formed of the same insulative material as the insulative slices, for example. This sub-layer serves mainly to anchor the fibrous refractory reinforcement since, during the fabrication of the thermal protection coating, the latter is engaged in grooves formed in this sub-layer. The latter can also have other functions, such as protection against X-rays or super-insulation using cellular material.

A third type of thermal protection is proposed in document EP-0.471.605 wherein thermal protection is obtained by winding a plurality of superposed layers of plush refractory filaments around a mandrel temporarily provided with radial barbs and reinforcing pins, also made of refractory material, that form an integral part of the finished thermal protection.

Finally, document EP-0.501.861 proposes three-dimensional thermal protection as in the previous document formed of a stack of impregnated woven materials traversed by refractory material fibers.

These various solutions constitute undoubted progress. Nevertheless, there is a need for non-ablative thermal protection resistant to an erosive flow of gas at high speed and to severe thermal aggression, either for longer time periods or for the same time periods, for parts where the geometry must remain unchanged.

An object of the invention is to meet this need.

BRIEF SUMMARY OF THE INVENTION

To this end the invention proposes a thermal protection device adapted to extend along a surface to be protected from a thermally and mechanically severe external environment, having an inside face adapted to face the surface to be protected and an outside face adapted to be exposed to the external environment, including a composite layer containing an armature buried in a thermally insulative material matrix. The thermal protection device further includes a ceramic, metal or metalloid external layer of which the outside face is part and that is attached to the composite layer.

Accordingly, in accordance with the invention, the external layer can be a layer of ceramic (for example alumina, titanium dioxide, possibly combined with alumina, zirconia, zircon ($ZrO_2+SiO_2$), spinel (MgO, $Al_2O_3$), etc., alone or in combination) or of metal (including molybdenum, tungsten, titanium, etc., alone or in combination) and/or of a metalloid (including titanium carbon, tungsten carbide, etc., alone or in combination). Generally speaking, these elements can be single or combined (metals, oxides, carbides, nitrides, borides, etc., alone or in combination), having a high melting point, typically greater than 1,600° C., possibly approximately 2,000° C., even 2,500° C.

It has previously been proposed to associate a second layer with the composite layer but the latter has generally been disposed between the composite layer and the surface to be protected. On the other hand, the invention teaches the provision of the composite layer with an external layer directly exposed to the aggressive external environment. This approach goes somewhat against the teachings of the known prior art since the prior art documents referred to above would lead a person skilled in the art to consider it necessary, in order to achieve good retention of the exterior part of the thermal protection, to provide an anchorage in the direction of the thickness of the composite layer, in practice by means of fringes or tapes. However, and very surprisingly, it has been found that a clear improvement in resistance to a thermally and mechanically aggressive environment can be obtained, without using such transverse reinforcements, by the simple addition to the composite layer of a ceramic, metal or metalloid external layer.

In accordance with preferred features of the invention:

- the device includes an intermediate bonding layer between the composite layer and the ceramic, metal or metalloid external layer;
- the refractory armature includes a mesh part and fringes attached to the mesh part;
- the mesh part extends along the inside surface and the fringes extend at least partly towards the external layer;
- the fringes have a non-zero inclination less than 90° to the inside and outside faces, preferably less than 45°, for example between 20° and 40°;
- the thermal protection device has an axis of revolution;
- the refractory armature is of silica and the matrix is of phenolic resin;
- the external layer can be of ceramic, for example formed of one or more oxides such as alumina, spinel (MgO, $Al_2O_3$), zirconia, possibly combined with silica (zircon), titanium dioxide, etc., alone or in combination; it can in particular be alumina, alone or in combination with titanium dioxide (preferably in a ratio of 60/40 percent by weight), or even spinel, or zirconia;
- the external layer can also be a metal such as molybdenum, tungsten, or titanium;
- the external layer can also be a metalloid, such as carbides of titanium and/or tungsten in particular;
- the external layer has a melting point greater than approximately 1,600° C., preferably greater than approximately 2,000° C.; and
- the external layer is bonded to the composite layer by a layer of copper.

The invention also proposes a method of fabricating thermal protection adapted to extend along a surface to be protected from a thermally aggressive external environment, including the following steps:

- a composite layer is made containing a refractory armature buried in a thermally insulative matrix, the composite layer having a face adapted to face the surface to be protected; and
- a ceramic, metal or metalloid external layer is applied at least indirectly to the composite layer, defining an external face adapted to be exposed to the thermally aggressive external environment.

According to other preferred features of the invention:

- the composite layer is made by impregnating a reinforcement with a resin, by applying the impregnated reinforcement to a surface and then polymerizing the resin;
- the impregnated reinforcement is applied by winding it onto a surface of revolution;
- the impregnated reinforcement is applied by winding it onto the surface to be protected;
- the reinforcement is a fringed mesh;
- the external layer is fixed to the composite layer so that the fringes are directed towards the external layer;
- the composite layer is made by imparting to the fringes a non-zero inclination less than 90°, preferably less than 45°, for example between 20° and 40°;
- the composite layer is made by impregnating a silica reinforcement with phenolic resin and then polymerizing the resin;
- the external layer is made from a ceramic based on alumina;
- the external layer is made from a mixture of alumina and titanium dioxide;
- the mixture is prepared in a proportion of 60% alumina and 40% titanium dioxide;
- the external layer is made from molybdenum;
- a layer of copper is applied to the composite layer before applying the external layer; and
- the external layer is applied by means of a plasma torch.

Objects, features and advantages of the invention emerge from the following description given by way of non-limiting example with reference to the appended drawings.

DETAILED DESCRIPTION OF THE PREFERRED EMBODIMENT

Figure 1:
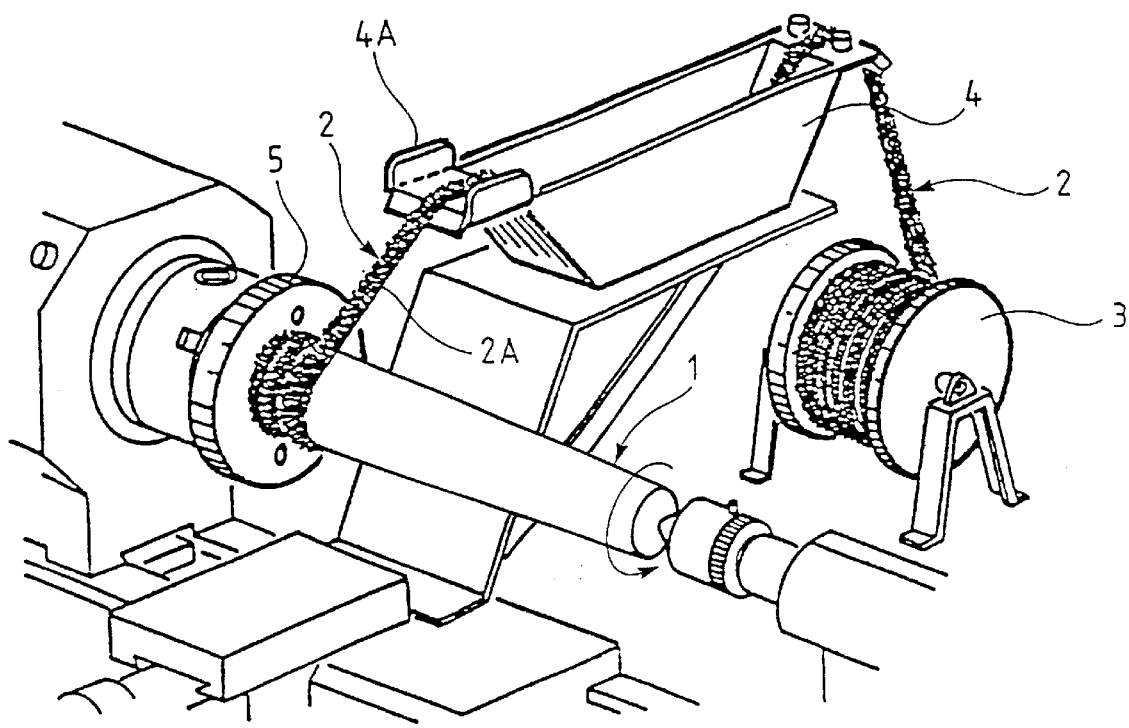
FIG. 1 is a schematic perspective view of an installation for preparation by winding of the preform of a thermal protection device of the invention.
Figure 2:
FIG. 2 is a side view of one embodiment of an armature to be incorporated into the preform.
Figure 3:
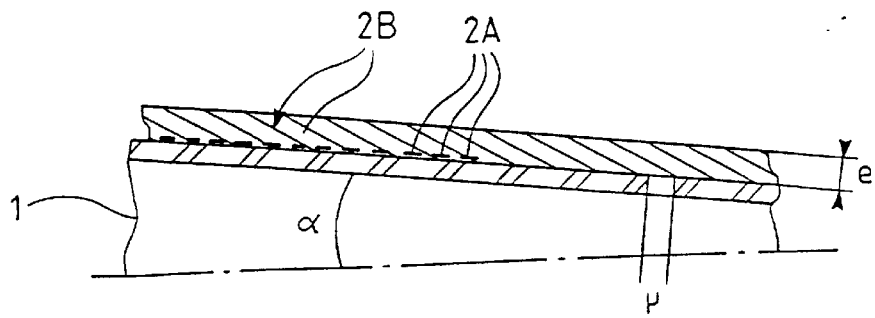
FIG. 3 is a partial sectional cutaway view of the preform.

FIGS. 1 through 3 correspond to the first phase of making a thermal protection device, in particular, the preparation of a preform.

This first phase involves winding a reinforcement 2 onto a body 1.

The body 1 is, for example, the body intended to be protected by the thermal protection device. Alternatively, it can be an intermediate mandrel, however.

Here the body 1 is frustoconical. In this case the winding is advantageously carried out in the direction toward its smallest diameter portion.

The body 1 is rotated about its axis of revolution.

The reinforcement 2 is a fringed textile or mesh such as fringed tape, ribbon or braid.

As shown in FIG. 2, the reinforcement 2 has an undeformable mesh part 2A with a small mesh and fringes or fibers 2B.

In practice the reinforcement 2 is initially stored on a spool 3.

The reinforcement 2 is in principle stored in a non-impregnated state. This is why, before it is wound onto the body 1, the reinforcement 2 is passed through an impregnation tank 4 in which it is impregnated with an appropriate resin (not shown), preferably a resin that can be polymerized.

The impregnation tank 4 advantageously includes a guide trough 4A that, as the body 1 rotates about an axis, guides the reinforcement 2 so that the latter is wound on in turns that are preferably contiguous.

An inclination monitoring unit (not shown) is provided so as to impart to the fringes 2B of the reinforcement 2 a required inclination (less than 45°, for example, preferably between 20° and 40°).

When the winding has been done over all of the active surface of the body 1, the body 1 with its winding is put into an autoclave where the resin impregnating the reinforcement 2 is hardened, in practice polymerized.

The preform shown in FIG. 3 therefore has a body 1 with a cone angle α (half the angle at the apex), covered with a composite layer including the reinforcement 2 with fringes 2B advantageously inclined towards the narrowest part of the body 1, with a winding pitch p and with a thickness e.

In general terms, the process steps are known in themselves, for example from related art document EP-0.174.886.

Figure 4:
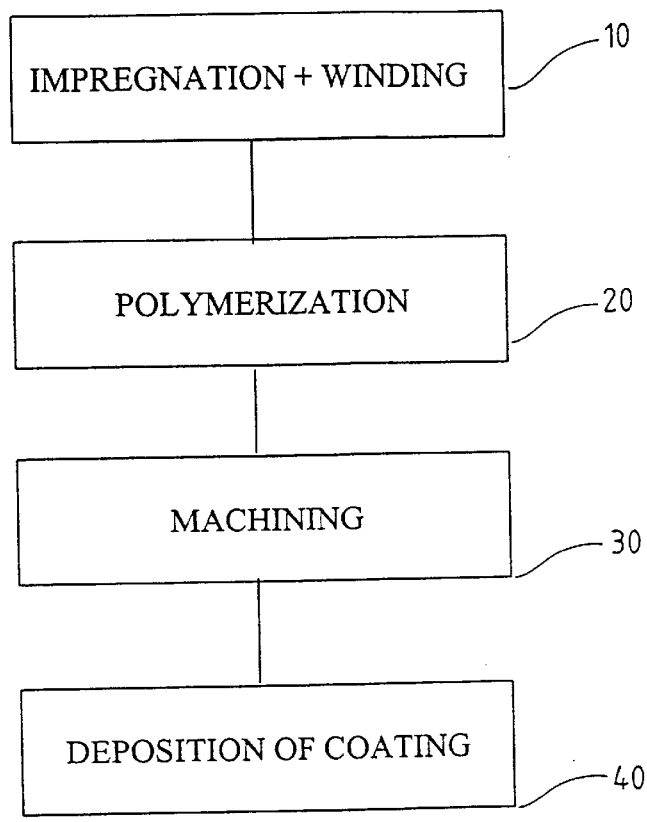
FIG. 4 is a flowchart showing the principal steps of preparing a thermal protection device of the invention.

Referring to FIG. 4, the fabrication of a thermal protection device in accordance with the present invention includes, after an impregnation and winding step 10, a polymerization step 20, after which the preform of FIG. 3 is obtained, a machining step 30 and then a step 40 during which a coating is deposited.

After the impregnation resin has been polymerized it would generally seem necessary to machine the body 1 to its final size, which can remove up to half the thickness of the polymerized composite layer.

The machining can be done on a lathe 5 that is also used for the winding on (see FIG. 1).

Finally, the step 40 includes depositing an external ceramic coating 7 onto the machined composite layer 6 by any appropriate method.

To optimize the bond between the ceramic layer 7 and the composite layer 6, a bonding sub-layer 8 can be used therebetween, if necessary.

It is the ceramic layer 7 that is intended to be exposed to a thermally aggressive external flow. The ceramic layer 7 is advantageously polished to minimize the effects of mechanical erosion and thermal aggression.

Figure 5:
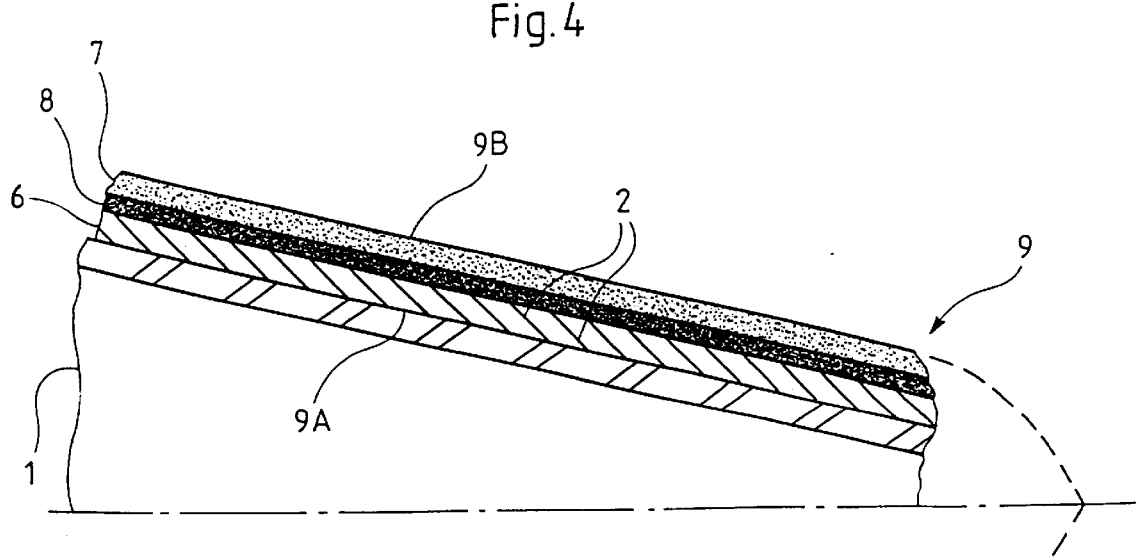
FIG. 5 is a partial sectional cutaway view of a thermal protection device according to the invention, the section being cut along its axis.

As shown in FIG. 5, a thermal protection device 9 has an inside face or surface 9A adapted to extend along a surface to be protected and an outside face or surface 9B intended to be exposed to the external environment. The thermal protection device 9 includes the composite layer 6 that contains a refractory armature embedded in a thermally insulative material matrix and the ceramic layer 7 of which the outside face 9B is part.

The reinforcement 2 that forms the armature is preferably a fringed silica reinforcement 2 and the polymerizable resin is preferably a phenolic resin, advantageously a charged phenolic resin.

The fringed silica reinforcement 2 has the following specifications, for example:
- height: 25 mm,
- mesh: six per centimeter,
- mass: 2.88 g/m,
- fringes and mesh part: 80 Tex (i.e. 80 g/m) silica filament, silica type: C14.80Z20.QS13.

Fringed silica reinforcements of the above kind can be obtained from CRST (Conseils et Recherches en Substrats Textiles) of 21350 Gissey-le-Vieil, for example.

The matrix of the composite layer 6 is preferably made of NORSOPHEN 1703 phenolic resin, advantageously charged with a powder based on zirconium, for example stabilized zirconium oxide. The resin can be highly charged: the charge can represent one to three times the mass of resin.

To make the preform, the fringed reinforcement 2 is wound onto the body 1 with a pitch of 2 mm (approximately equal to the thickness of the fringe). For good winding the fringed reinforcement 2 is advantageously tensioned, for example to a value in the order of 2 daN.

As shown in FIG. 1, the fringed reinforcement 2 is first impregnated by dipping it in the impregnation tank 4 containing a mass of resin prepared beforehand with its charge. Impregnation is preferably completed by the application of an additional bead of resin at the point of contact of the fringed reinforcement 2 with the body 1 during winding. This application can be effected using an extruder gun (not shown) of any type, for example a SEMCO 220572 gun that is fitted with a cartridge with a flat end nozzle.

The two impregnation steps are preferably carried out with resins having different amounts of charge: the resin with which the fringe 2B is first impregnated by dipping is advantageously less charged than the resin applied at the point of contact of the fringed reinforcement 2 with the body 1. The dip impregnation resin can contain a charge of stabilized zirconium oxide of substantially the same mass as the resin, for example, and the additional resin applied at the point of contact between the fringe 2B and the body 1 can include a charge representing three times the mass of the resin.

After winding, the following are advantageously applied:
- a glass pump woven material for absorbing excess resin;
- a binding layer formed by winding on a carbon filament with a pitch of 10 mm at a tension of 0.5 daN, which has the advantage of securing the assembly; and
- a delamination woven material, for example the woven glass material E Ref 7628 from HEXEL of 38630 Les Avenieres.

The preform is polymerized in an autoclave at a pressure of ten bars. If, as shown in FIG. 1, the body 1 is frustoconical, it is advantageously positioned vertically in the autoclave with the point at the top.

Polymerization is obtained by maintaining the body or the mandrel 1 with the mass of impregnated fringes at 120° C. for twelve hours between periods of approximately two hours in which the temperature is raised and lowered.

The ceramic coating 7 is advantageously applied by thermal spraying, for s example using the plasma torch supplied by PLETECH of F 94420 LE PLESSIS-TREVISE, France.

The ceramic coating 7 is advantageously based on alumina, to be more precise on alumina and titanium dioxide, preferably in proportions of approximately 60/40 percent by weight.

To assure a good bond between the external layer and the matrix of the composite layer 6, the deposition operation begins with application by thermal spraying onto the composite layer 6 of a (substantially pure) copper bonding, copper being highly compatible with the phenolic resin and with the alumina/titanium dioxide.

For thermal protection 25 mm thick, for example, the composite layer 6, initially approximately 4 mm thick, has a thickness of approximately 2 mm after machining, the copper bonding sub-layer 8 has a thickness of approximately 0.1 mm and the alumina/titanium dioxide external layer has a thickness of approximately 0.4 mm.

The polish of the external surface of the ceramic layer 7 preferably corresponds to a Ra value less than or equal to 1.6.

The ceramic layer 7, directly exposed in use to an erosive flow of limited duration, offers entirely satisfactory resistance despite the absence of any anchorage within the thickness of the thermal protection.

Comparative tests have been carried out in a wind tunnel under conditions corresponding to a velocity of approximately 1,400 m/s at zero altitude, for ten seconds, on a sample in accordance with the invention made as indicated above and on a control sample having only an identical composite layer, with no external layer. After testing, the control sample test piece showed erosion of the composite layer in the order of 1 mm while the sample test piece in accordance with the invention showed no detectable erosion. This clearly establishes the efficacy of the ceramic external layer.

The example described hereinabove corresponds to a mesh reinforcement 2 with the fringes 2B directed outward. The invention naturally covers the situation in which the mesh part 2A is immediately underneath the ceramic layer 7 with the fringes 2B directed toward the surface to be protected. Furthermore, the fringes 2B are not necessarily all free and of constant length: they can be looped fringes or any other type of fringe, as described for example in EP-0.174.886. The invention likewise applies to the situation in which, by analogy with EP-0.398.787, a wide mesh refractory material is associated with a mesh reinforcement or, by analogy with FR-2.652.036, the composite layer 6 includes a succession of substantially parallel refractory fiber reinforcement slices inclined to the surface to be protected, with insulative slices between them. Finally, there can be a plurality of superposed composite layers 6.

There can be between the surface to be protected and the composite layer 6, supplier SODIEMA of 78140 Vélizy, a primary underlayer (not shown), for example REDUX 71 from CIBA-GEIGY, that has the benefit of improving adhesion.

There can be a flexible material (foam) sub-layer (not shown) between the surface to be protected and the composite layer 6 that has the benefit of absorbing deformations due to loads.

The invention also covers a polyimide, organic, phenolic or polystyrilpyridine type polymerizable monoplast resin, a semi-organic (silicone) resin or an elastomer (silicone) resin.

The invention also covers a reinforcement based on ceramic (silicon carbide) fibers, for example, rather than silica.

As an anlternative, the external ceramic layer can be composed of the following materials: metals (including molybdenum, tungsten, titanium, etc), ceramics (zirconia, zircon, spinel, etc.) and metalloids (including carbides of titanium and/or tungsten). These are typically elements, possibly in combination (carbides, oxides. nitrides or borides) with a high melting point (typically greater than 1,600° C. or even 2,000° C.).

The above materials have the properties listed in Table 1.

Note that apart from titanium the melting point is greater than approximately 2,000° C. and the linear expansion is less than $6.10^{-6}$/° C. The oxides, carbides and nitrides and Ti have a thermal conductivity less than 45 W/m.° C., possibly less than 15 W/m.° C., or even less than 5 W/m.° C.

The foregoing description has been given by way of non-limiting example only, and many variants can be envisioned by a person of ordinary skill in the art without departing from the scope of the invention.

TABLE 1

| Material | Chemical formula | Melting point ° C. | Linear expansion $10^{-6}$/° C. | Thermal conductivity w/m. ° C. | Specific heat J/kg. ° C. |
| --- | --- | --- | --- | --- | --- |
| Alumina | $Al_2O_3$ | 2050 | 8.0 | 4 at 1315° C. | 1050 |
| Zirconia | $ZrO2$ | 2700 | 7.5 | 3 at 1315° C. | 590 |
| Zircon | $ZrO_2 + SiO_2$ | 2500 | 4.5 | 4 at 1200° C. | 630 |
| Spinel | $MgO + Al_2O_3$ | 2130 | 8.5 | 2 at 1315° C. | 1050 |
| Titanium carbide | TiC | 3140 | 6.9 | 40 at 1100° C. | 1050 |
| Tungsten carbide | WC | 2780 | 6.3 | 43.3 at 1100° C. | 300 |
| Boron nitride | BN | 2721 | 7.5 | 26 at 900° C. | 1570 |
| Molybdenum | Mo | 2615 | 5.75 at 1000° C. | 105 at 1000° C. | 310 at 1000° C. |
| Tungsten | W | 3400 | 4.6 at 1000° C. | 111 at 1000° C. | 151 at 1000° C. |
| Titanium | Ti | 1667 | 9.9 at 800° C. | 13 at 800° C. | 682 at 800° C. |

What is claimed is:

1. A method of providing thermal protection for a surface to be protected from a thermally and mechanically aggressive external environment, said method comprising the steps of:

providing a composite layer of a thermally insulative matrix having a refractory armature embedded in said thermally insulative matrix, said composite layer facing said surface to be protected; and applying an external layer to said composite layer, said external layer comprising an element selected from the group consisting of ceramic, metal and metalloid whereby said external layer defines an external face exposed to said thermally and mechanically aggressive external environment.

2. A method according to claim 1, wherein the step of providing a composite layer further comprises the steps of impregnating a reinforcement with a resin; applying said resin to said impregnated reinforcement; applying said impregnated reinforcement to said surface to be protected; and polymerizing said resin.

3. A method according to claim 2, wherein the step of impregnating said reinforcement further comprises the step of winding said reinforcement onto a surface of revolution.

4. A method according to claim 3, wherein the step of applying said impregnated reinforcement to said surface to be protected comprises the step of winding said impregnated reinforcement onto said surface to be protected.

5. A method according to claim 4, wherein said reinforcement is composed of a fringed mesh having a plurality of fringes.

6. A method according to claim 5, wherein said method further comprises the step of fixing said external layer to said composite layer whereby said plurality of fringes are aligned in a direction toward said external layer.

7. A method according to claim 6, wherein the step of providing said composite layer further comprises the step of imparting an inclination between 0° and 90° to said plurality of fringes.

8. A method according to claim 7, wherein the step of providing said composite layer further comprises the step of impregnating a silica reinforcement with phenolic resin; and polymerizing said phenolic resin.

9. A method according to claim 1, wherein said step of applying an external layer further comprises the step of applying said external layer composed of a ceramic based on alumina.

10. A method according to claim 1, wherein said step of applying an external layer further comprises the step of applying said external layer composed of a mixture of alumina and titanium dioxide.

11. A method according to claim 10, wherein said mixture is prepared in a proportion of 60% alumina and 40% titanium dioxide.

12. A method according to claim 1, wherein said step of applying said external layer further comprises the step of applying said external layer made from a metal based on molybdenum or tungsten.

13. A method according to claim 12 further comprising the step of applying a layer of copper to said composite layer before applying said external layer.

14. A method according to claim 1, wherein said step of applying said external layer further comprises the step of applying said external layer by thermal spraying.

* * * * *

UNITED STATES PATENT AND TRADEMARK OFFICE
CERTIFICATE OF CORRECTION

PATENT NO.     : 6,468,594 B1
DATED          : October 22, 2002
INVENTOR(S)    : Jacques Fages It is certified that error appears in the above-identified patent and that said Letters Patent is hereby corrected as shown below:

<u>Column 7,</u>
Line 8, after "for", kindly delete the "s".

Signed and Sealed this

Eleventh Day of March, 2003

JAMES E. ROGAN
*Director of the United States Patent and Trademark Office*